United States Patent Office 3,591,398
Patented July 6, 1971

3,591,398
PROCESS FOR PRODUCING TITANIUM DIOXIDE PIGMENTS
Albert H. Angerman, Wilmington, Del., assignor to E. I. du Pont de Nemours and Company, Wilmington, Del.
No Drawing. Filed Apr. 5, 1968, Ser. No. 719,246
Int. Cl. C09c 1/36, 3/00
U.S. Cl. 106—300
4 Claims

ABSTRACT OF THE DISCLOSURE

Titanium dioxide pigment is treated by maintaining a water slurry of the pigment at a pH of below about 7 and applying silica in an amount of 3% to 10% by weight, based on the pigment, by adding a solution of soluble silicate to the water slurry. The resultant slurry is adjusted to a pH of from 6–8 and alumina in an amount of 1% to 10% by weight, based on the pigment, is precipitated in the slurry. The pigment produced by this treatment has good hiding power and film integrity.

BACKGROUND OF THE INVENTION

The treatment of pigmentary titanium dioxide in the rutile or anatase form with hydrous oxides, especially silica and alumina, is known in the art to provide resistance to chalking and discoloration in paints, good opacity in paper and good hiding power in flat paints. Typical application techniques for applying silica are taught in U.S. 2,885,366; 2,387,534; and 2,296,636. Generally, the silica is applied by precipitation from sodium silicate with acid in an aqueous slurry of the pigment. Since the sodium silicate acts as a dispersing agent for the pigment, the art prefers to add the silicate to the slurry prior to addition of the acid, as taught in U.S. 2,296,636 (page 5, column 9, lines 27–41). A typical technique for applying alumina is taught in U.S. 2,284,772. Unfortunately, the improved hiding power in flat paints which these treated pigments possess compared to the untreated pigments, is accompanied by an increased susceptibility of the paint film to staining and its more rapid failure on scrubbing.

For purposes of this application, pigmentary means that the material is pulverulent and of good whiteness with an average particle diameter of from about 0.15 to about 0.3 micron.

SUMMARY OF THE INVENTION

In accordance with the present invention a process is provided for treating titanium dioxide pigment by adding to an aqueous slurry of the pigment maintained at a pH of below about 7, a solution of soluble silicate in an amount calculated to provide from about 3 percent to about 10 percent by weight of silica, calculated as $SiO_2$, based on the weight of the pigment, and thereafter precipitating in the slurry, alumina in an amount from about 1 percent to about 10 percent by weight, calculated as $Al_2O_3$, based on the weight of the pigment, while maintaining the slurry at a pH of from about 6 to about 8. The process produces a titanium dioxide pigment with good hiding power and film integrity.

DESCRIPTION OF TERMS AND TESTS

In the examples which follow, the test results are obtained by the procedures described below.

HIDING POWER (H.P.)

A film of prepared paint is drawn on a Morest Chart Form 09, a glossy paper chart having black and white areas, using a draw-down blade with an .003 inch clearance. When the film is dried, the reflectances over the white and black backgrounds are measured using a Gardner Automatic Multipurpose Reflectometer. From these readings the contrast ratio is determined:

$$\text{Contrast ratio} = \frac{\text{reflectance over black}}{\text{reflectance over white}}$$

Similarly, the contrast ratio is determined on a standard pigment. The relative hiding power of the samples is calculated as:

$$\text{H.P.} = \frac{\text{contrast ratio of sample}}{\text{contrast ratio of standard}} \times 100$$

STAIN RESISTANCE

Paint films are drawn on a plain white chart, using a 6 mil blade clearance, side by side with a control paint made from a standard pigment. A "2" strip across both dried films is flooded with a test ink (K & H Testing Compound of K & H Laboratories, Melrose Park, Ill.). After 1½ minutes the excess ink is wiped off and a visual comparison of the stain is made.

SCRUB RESISTANCE

Side-by-side films of a sample and a control are placed on a black chart in the manner described in the Stain Resistance test, and a slurry of 20 parts by weight of water and 50 parts of an abrasive detergent cleansing powder is placed completely over a 2 inch wide strip across both films. A block brush, 3" x 1½" x ½" having stiff black butt-cut Chinese hog bristles, is passed back and forth under moderate pressure across the two films. After 20 strokes the chart is rotated 180° and the 20 strokes repeated. This procedure is continued until both films permit the black background to show through. The relative wear of the sample film versus the standard is visually estimated.

The paint for the above procedures is prepared by mixing the following ingredients in a one-quart Cowles Mixer running at 2000 r.p.m. for 3–4 minutes.

|  | Gms. |
|---|---|
| Water | 275.0 |
| Phenyl mercury acetate | 0.3 |
| Anhydrous potassium tripolyphosphate powder | 2.0 |
| Water soluble soya lecithin | 8.0 |
| Tergitol NPX (Union Carbide Co.) | 2.0 |
| NOPCO NDW Antifoam (NOPCO Chem. Co., Newark, N.J.) | 0.5 |
| Pigment being tested | 200.0 |
| Diatomaceous silica | 45.0 |
| Clay ASP400 (Mineral & Chem. Div. of Phillip Corp.) | 130.0 |
| Calcium Carbonate, Camel-Tex (H. T. Campbell Co.) Towson, Md. | 100.0 |

After the initial mixing, the speed is increased to 3000 r.p.m. for 10 minutes. The batch is then reduced by mixing in the following:

|  | Gms. |
|---|---|
| Methyl Cellulose, 4000 cps., 3½ % solution | 120.0 |
| "Carbitol" Acetate (Dow Chemical Company) | 120.0 |
| "NOPCO" NDW | 0.5 |
| Polyvinyl Ac. "Elvacet" (E. I. du Pont de Nemours and Company, Inc.) | 224.0 |
| Water | 40.0 |

In both the stain and scrub procedures the rating abbreviations have the following meaning:

sl—: slightly poorer than the standard
vsl—: very slightly poorer than the standard
vvsl—: very, very slightly poorer than the standard
=: equal to the standard
+: better than the standard The standard used in all of the following examples is a commercial titanium dioxide pigment produced by the vapor phase oxidation of $TiCl_4$, and treated with 1% by weight $TiO_2$, 3% by weight $SiO_2$ and 6% by weight $Al_2O_3$. The "C" portions of Examples 4 and 5 are titanium dioxide pigments produced by the seeded hydrolysis of a sulfuric acid solution of ilmenite ore. The standard and "C" samples are treated as taught in the prior art to add $TiO_2$, $SiO_2$ and $Al_2O_3$.

EXAMPLE 1

A 300 grams solid per liter aqueous slurry is prepared by mixing, at 60° C., a rutile pigment obtained from the vapor phase oxidation of $TiCl_4$ and containing a small amount of $Al_2O_3$ from the cooxidation of $AlCl_3$, and water. One-twelfth liter of concentrated HCl is added to 6.67 liters of the slurry (2000 grams of pigment) to effect a pH of below 4. A solution of sodium silicate, at a concentration of 200 g./l. $SiO_2$ and having a weight ratio of $SiO_2/NaO_2$ of 3.25, is gradually added during agitation until the pH of the slurry reaches 7. The amount of silicate used corresponds to about 5% $SiO_2$ on the $TiO_2$ basis. Fifty percent sulfuric acid and a sodium aluminate solution containing 120 grams $Al_2O_3$ are simultaneously added at rates which keep the pH between 6 and 8. The slurry of the pigment with 6% by weight $Al_2O_3$ is finally adjusted to a pH of 6.8. The pigment is recovered by filtering, washing, drying at about 120° C., and micronizing. The properties of the pigment are shown in Table I.

EXAMPLE 2

To 2497 liters of a slurry (a total of 1100 lbs. of solids) at a concentration of 200 g./l. rutile pigment obtained by vapor phase oxidation of $TiCl_4$, 15.118 kilograms (33.3 lbs.) of 96% sulfuric acid are added to effect a pH of below 4. The slurry is warmed to 60° C. and the sodium silicate solution as described in Example 1 is slowly added during agitation until the pH of the slurry reaches about 7. Agitation is continued to insure that the pH is stable and within the 6–8 range. Concentrated sulfuric acid and 85.5 liters of a sodium aluminate solution containing 350 g./l. of $Al_2O_3$ and a 25% excess of NaOH over the composition $NaAlO_2$ are added simultaneously in separate streams to the stirred slurry at rates regulated to hold the pH in the 6–8 range. The amount of reagents used provides 6% $SiO_2$ by weight and 6% $Al_2O_3$ by weight, based on the pigment. Properties of the recovered pigment are shown in Table I.

EXAMPLE 3

Example 2 is repeated except that, instead of the initial sulfuric acid, 13.9832 kg. (30.81 lbs.) of $TiCl_4$ are added to the 60° C. pigment slurry with stirring to permit hydrolysis of the $TiCl_4$ to HCl and hydrous titanium oxide, effecting a pH of below 4. The HCl formed in the slurry is neutralized by the addition of the sodium silicate solution, and the alumina treatment of Example 2 is then applied. The product containing precipitated hydrous oxides equivalent to about 1% $TiO_2$, 6% $SiO_2$, and 6% $Al_2O_3$, is recovered. The resulting properties are shown in Table I.

TABLE I

| Sample | Hiding power | Stain resistance | Scrub resistance |
| --- | --- | --- | --- |
| Example 1 | 115 | vvsl– | vvsl– |
| Example 2 | 108 | vvsl– | = |
| Example 3 | 112 | vvsl– | = |

EXAMPLE 4

A rutile pigment is prepared by the seeded hydrolysis of a sulfuric acid solution of ilmenite, filtered, washed and calcined in the presence of about 1% of sodium and potassium sulfates. The resultant pigment is divided into portions A and B, and treated by the methods described in Examples 2 and 3 respectively. The amounts of hydrous oxides precipitated on these pigments and a prior art sample, C, are shown in the following table along with properties of the pigment.

| Sample | Percent TiO₂ | Percent SiO₂ | Percent Al₂O₃ | Hiding power | Scrub resistance |
| --- | --- | --- | --- | --- | --- |
| A | 0 | 6 | 6 | 112 | vsl– |
| B | 1 | 6 | 6 | 111 | sl– |
| C (prior art) | 1 | 3 | 6 | 95 | vvsl+ |

EXAMPLE 5

A rutile pigment, prepared as in Example 4 except that it is calcined in the presence of about 2% ZnO, is divided into portions A and B and treated by the methods described in Examples 2 and 3 respectively. The amounts of hydrous oxides and the properties of the pigments are shown in the following table.

| Sample | Percent TiO₂ | Percent SiO₂ | Percent Al₂O₃ | Hiding power | Scrub resistance |
| --- | --- | --- | --- | --- | --- |
| A | 0 | 6 | 6 | 111 | = |
| B | 1 | 6 | 6 | 105 | vvsl– |
| C (prior art) | 1 | 3 | 6 | 9 | vsl– |

EXAMPLE 6

Another series of tests is run on chloride oxidation process rutile and tabulated below. In each case the amounts of silica and alumina are shown along with relative hiding power, scrub resistance, and stain resistance of the samples prepared by the process of this invention (new) and the prior art method (old) where sodium silicate is added to the slurry first and then acid is added to neutralize the silicate.

| Treatment, percent | | Hiding power | | Scrub resistance | | Stain resistance | |
| --- | --- | --- | --- | --- | --- | --- | --- |
| SiO₂ | Al₂O₃ | New | Old | New | Old | New | Old |
| 4 | 4 | 108 | 97 | vsl– | vsl– | = | = |
| 4 | 8 | 106 | 96 | vsl+ | vsl– | = | = |
| 6 | 4 | 112 | 103 | vvsl– | vsl– | vvsl– | vvsl– |
| 6 | 6 | 113 | 108 | vvsl– | vsl– | vvsl– | vvsl– |
| 6 | 8 | 119 | 104 | vvsl– | vsl– | vsl– | vvsl– |
| 8 | 4 | 111 | 103 | vvsl– | vsl– | vsl– | vvsl– |
| 8 | 8 | 111 | 111 | vsl– | sl– | vsl– | vsl– |

THE SLURRY

The base titanium dioxide pigment may be prepared by the high temperature vapor phase oxidation of $TiCl_4$, the vapor phase hydrolysis of $TiCl_4$, or the hydrolysis of colloidally seeded sulfuric acid solutions of titaniferous raw materials such as ilmenite. The hydrolysate of the sulfuric acid process must be washed and calcined to develop the crystalline characteristic and particle size needed for the good light scattering characteristics of pigments. The temperature of the slurry being treated may vary from room temperature to 90° C., but it is prefered that the tempeature be from 50° C. to 70° C. The slurry should be agitated throughout the precipitation of both the silica and the alumina to insure general uniformity of the pH conditions within the specified ranges.

THE ACIDIFICATION

The slurry must be acid during the addition of the effective portion of the soluble silicate. The acid used may be any acid, such as HCl, $H_2SO_4$, $HNO_3$, or $H_3PO_4$, having a dissociation constant sufficiently high to precipitate silica, and used in an amount sufficient to maintain an acid condition in the slurry, preferably below a pH of 4, during addition of substantially all the silicate solution. Compounds such as $TiOSO_4$ or $TiCl_4$ which hydrolize to form acid, may be used. The acid may be added in excess, but it is preferred that the amount of acid equivalent to the alkali present in a predetermined amount of silicate be added to the slurry prior to introducing the silicate. The silica may also be precipitated at a constant acid level, e.g., pH 1 by the simultaneous addition of the reagents, the optimum acid level being determined experimentally.

THE SILICATE

Any soluble silica may be used in the process including sodium or potassium silicate. Commercially available water soluble sodium silicates with $SiO_2/Na_2O$ weight ratios from about 1.6 to about 3.75 and varying from 32% to 54% by weight of solids, with or without further dilution, are the most practical. The amount of silica precipitated in the acid environment may be from about 3% to about 10% by weight, calculated as $SiO_2$, based on the amount of pigment being treated, but it is preferable that the amount be from about 4% to about 8% by weight with about 6% being the most effective. Alternative to adding all the acid first, the soluble silicate and the acid may be added simultaneously so long as the acidity of the slurry is maintained at a pH of below about 7.

THE ALUMINA

The alumina, essential to good film integrity must be precipitated in an environment having a pH of from about 6 to about 8 to avoid subjecting the treated pigment to unduly acid or alkaline conditions. This is conveniently done by simultaneously mixing an alkaline solution and an acid solution at least one of which contains aluminum, at relative rates which maintain a pH between about 6 and about 8. Illustrative pairs of solutions are sodium hydroxide and aluminum sulfate, sodium aluminate and sulfuric acid and sodium aluminate and alum. The amount of alumina precipitated may be from 1% to 10% by weight, calculated as $Al_2O_3$, based on the pigment being treated, with 4% to 8% by weight being preferred.

This process may be applied to pigments which have been previously treated with oxides such as titania, but their presence is not essential to the benefits herein obtained. After treatment according to this process, the pigment is recovered by known procedures including neutralization of the slurry if necessary, filtration, washing, drying and frequently a dry grinding step such as micronizing. Drying is not necessary, however, as a thick slurry of the product can be used directly in preparing emulsion paints where water is the liquid phase. The process provides a method for obtaining good hiding power and good film integrity in titanium dioxide pigments.

Further variations and applications of this invention will be obvious to one skilled in the art upon reading this disclosure without departing from the inventive concept.

What is claimed is:
1. A process for treating titanium dioxide pigment comprising:
   (A) adding to an aqueous slurry of said pigment maintained at a pH below 7, a solution of soluble silicate in an amount calculated to provide from about 3% to about 10% by weight of silica, calculated as $SiO_2$, based on said pigment; and thereafter
   (B) precipitating in said slurry, alumina in an amount of from about 1% to about 10% by weight, calculated as $Al_2O_3$, based on said pigment, while maintaining said slurry at a pH of from about 6 to about 8.
2. A process as in claim 1 wherein said precipitation is accomplished by simultaneously intermixing said slurry with an acid solution and an alkali solution, at least one of which contains aluminum, at a rate controlled to maintain a pH of from about 6 to about 8 during said precipitation.
3. A process as in claim 2 wherein a pH below 4 is initially established by adding an amount of acid stoichiometrically equivalent to said alkali silicate.
4. A process as in claim 3 wherein said pigment is rutile, said acid used to precipitate silica is a sulfuric acid, and said alkali silicate is sodium silicate.

References Cited
UNITED STATES PATENTS

| | | | |
|---|---|---|---|
| 2,284,772 | 6/1942 | Seidel. | |
| 2,296,636 | 9/1942 | Hanahan. | |
| 2,387,534 | 10/1945 | Seidel. | |
| 3,035,966 | 5/1962 | Siuta | 106—308I |
| 3,418,147 | 12/1968 | Fields | 106—308I |
| 3,437,502 | 4/1969 | Werner | 106—308I |
| 3,146,119 | 8/1964 | Ritter | 106—300 |
| 3,383,331 | 5/1968 | Allan | 106—300 |

TOBIAS E. LEVOW, Primary Examiner

H. M. SNEED, Assistant Examiner

U.S. Cl. X.R.

106—308I